United States Patent
Thomas et al.

(10) Patent No.: US 11,265,359 B2
(45) Date of Patent: Mar. 1, 2022

(54) MANAGING CONCURRENT STREAMING OF MEDIA STREAMS

(71) Applicants: Koninklijke KPN N.V., Rotterdam (NL); NEDERLANDSE ORGANISATIE VOOR TOEGEPAST-NATUURWETENSCH APPELIJK ONDERZOEK TNO, 's-Gravenhage (NL)

(72) Inventors: Emmanuel Thomas, Delft (NL); Martin Prins, The Hague (NL); Omar Aziz Niamut, Vlaardingen (NL); Hans Maarten Stokking, Wateringen (NL)

(73) Assignees: Koninklijke KPN N.V., Rotterdam (NL); Nederlandse Organisatie Voor Toegepast-Natuurwetenschappelijk Onderzoek TNO, 'S-Gravenhage (NL)

( * ) Notice: Subject to any disclaimer, the term of this patent is extended or adjusted under 35 U.S.C. 154(b) by 355 days.

(21) Appl. No.: 15/517,092

(22) PCT Filed: Oct. 13, 2015

(86) PCT No.: PCT/EP2015/073692
§ 371 (c)(1),
(2) Date: Apr. 5, 2017

(87) PCT Pub. No.: WO2016/059060
PCT Pub. Date: Apr. 21, 2016

(65) Prior Publication Data
US 2017/0310731 A1    Oct. 26, 2017

(30) Foreign Application Priority Data
Oct. 14, 2014   (EP) .................................... 14188767

(51) Int. Cl.
*H04L 29/06* (2006.01)
*H04L 65/65* (2022.01)
(Continued)

(52) U.S. Cl.
CPC ........ *H04L 65/608* (2013.01); *H04L 65/1083* (2013.01); *H04L 65/80* (2013.01)

(58) Field of Classification Search
CPC .... H04L 65/608; H04L 65/1083; H04L 65/80
(Continued)

(56) References Cited

U.S. PATENT DOCUMENTS 5,729,471 A    3/1998   Jain et al.
6,487,220 B2   11/2002  Matsuzaki et al.
(Continued)

FOREIGN PATENT DOCUMENTS

CN      1951083 A       4/2007
CN      101543009 A     9/2009
(Continued)

OTHER PUBLICATIONS

Jin, Xin, and Yu-Kwong Kwok. "Cloud assisted P2P media streaming for bandwidth constrained mobile subscribers." In 2010 IEEE 16th International Conference on Parallel and Distributed Systems, pp. 800-805. IEEE, 2010. (Year: 2010).*
(Continued)

*Primary Examiner* — Suraj M Joshi
*Assistant Examiner* — Melaku Y Habtemariam
(74) *Attorney, Agent, or Firm* — Hamilton, Brook, Smith & Reynolds, P.C.

(57) ABSTRACT

A system and method are provided for managing a concurrent streaming of a first media stream (031) and a second media stream (032). The media streams (031, 032) represent different recordings of an event. The concurrent streaming of the media streams (031, 032) is enabled by a resource having
(Continued)

a resource limitation (080). To address this resource limitation, when it is determined that the resource limitation is exceeded by the concurrent streaming of the first media stream (031) streaming to a first streaming client (041) and the second media stream (032) streaming to a second streaming client (042), the first media stream (031) is selected for substituting the second media stream (032) in the streaming to the second streaming client (042). As a result of the substitution, the first and the second streaming client (041, 042) stream the same media stream rather than different media streams. This may have as advantage that the allocation of the resource is reduced, since the streaming of a same media stream to different streaming clients (041, 042) typically represents a lower resource allocation than the streaming of different media streams to different streaming clients.

12 Claims, 7 Drawing Sheets

(51) Int. Cl.
    *H04L 65/1083*      (2022.01)
    *H04L 65/80*      (2022.01)

(58) Field of Classification Search
    USPC .......................................... 709/217, 231, 232
    See application file for complete search history.

(56) References Cited

U.S. PATENT DOCUMENTS

| | | | |
|---|---|---|---|
| 6,522,672 B1 | 2/2003 | Matsuzaki et al. | |
| 6,577,333 B2 | 6/2003 | Tai et al. | |
| 7,099,281 B1 | 8/2006 | Conway | |
| 7,286,502 B1 | 10/2007 | Rao | |
| 7,822,869 B2* | 10/2010 | Zuckerman | H04L 67/1008 709/231 |
| 7,827,296 B2* | 11/2010 | Zuckerman | H04L 67/1002 709/223 |
| 7,835,437 B1 | 11/2010 | Zhang | |
| 7,920,523 B2 | 4/2011 | Grinshpun | |
| 8,159,995 B2 | 4/2012 | Beckman | |
| 8,732,274 B2 | 5/2014 | Bouazizi | |
| 8,767,081 B2* | 7/2014 | Kaheel | H04N 5/272 348/207.1 |
| 8,806,529 B2 | 8/2014 | Miles | |
| 9,125,073 B2 | 9/2015 | Oyman | |
| 9,292,826 B1 | 3/2016 | Chen | |
| 9,294,531 B2 | 3/2016 | Zhang | |
| 9,300,710 B2 | 3/2016 | Winterrowd | |
| 9,438,883 B2 | 9/2016 | Oyman | |
| 9,661,047 B2 | 5/2017 | Baratz | |
| 9,712,860 B1 | 7/2017 | Waggoner et al. | |
| 10,313,723 B2 | 6/2019 | Prins et al. | |
| 2003/0189589 A1 | 10/2003 | Leblanc et al. | |
| 2004/0071209 A1 | 4/2004 | Burg | |
| 2004/0071214 A1 | 4/2004 | Burg | |
| 2007/0102764 A1 | 5/2007 | Ando et al. | |
| 2007/0133608 A1 | 6/2007 | Isambart | |
| 2007/0165524 A1 | 7/2007 | Mascolo | |
| 2008/0069086 A1 | 3/2008 | Shin et al. | |
| 2008/0098446 A1* | 4/2008 | Seckin | H04L 47/15 725/114 |
| 2009/0060086 A1 | 3/2009 | Kimmich et al. | |
| 2009/0148124 A1* | 6/2009 | Athsani | G06Q 30/02 386/241 |
| 2009/0238371 A1 | 9/2009 | Rumsey et al. | |
| 2009/0309977 A1 | 12/2009 | Gevrekci | |
| 2009/0325526 A1 | 12/2009 | Chen et al. | |
| 2010/0088425 A1 | 4/2010 | Hooda | |
| 2010/0180315 A1 | 7/2010 | Nakamichi | |
| 2010/0254670 A1 | 10/2010 | Amsterdam et al. | |
| 2011/0082924 A1 | 4/2011 | Gopalakrishnan | |
| 2011/0138020 A1* | 6/2011 | Pantos | H04N 21/44016 709/219 |
| 2011/0255535 A1 | 10/2011 | Tinsman | |
| 2011/0280540 A1 | 11/2011 | Woodman | |
| 2011/0302319 A1 | 12/2011 | Ha et al. | |
| 2011/0307781 A1 | 12/2011 | Sood et al. | |
| 2012/0033037 A1 | 2/2012 | Chen et al. | |
| 2012/0185899 A1 | 7/2012 | Riedl et al. | |
| 2012/0185906 A1* | 7/2012 | Doets | H04L 65/1069 725/109 |
| 2012/0198506 A1 | 8/2012 | Joe | |
| 2013/0042015 A1 | 2/2013 | Begen et al. | |
| 2013/0084053 A1 | 4/2013 | Ackermann et al. | |
| 2013/0086278 A1 | 4/2013 | Schmidt | |
| 2013/0194996 A1 | 8/2013 | Oyman | |
| 2013/0301415 A1* | 11/2013 | Archer | H04L 65/4084 370/235 |
| 2014/0019593 A1 | 1/2014 | Reznik et al. | |
| 2014/0282777 A1 | 9/2014 | Gonder | |
| 2015/0026358 A1 | 1/2015 | Zhang et al. | |
| 2015/0235397 A1 | 8/2015 | Beckman | |
| 2015/0271237 A1 | 9/2015 | Stockhammer | |
| 2016/0088054 A1 | 3/2016 | Hassan et al. | |
| 2016/0088322 A1 | 3/2016 | Horov et al. | |
| 2016/0353148 A1 | 12/2016 | Prins et al. | |
| 2019/0273960 A1 | 9/2019 | Prins et al. | |

FOREIGN PATENT DOCUMENTS

| | | |
|---|---|---|
| CN | 103222277 A | 7/2013 |
| JP | 2007-115293 | 5/2007 |
| JP | 2009-188735 | 8/2009 |
| WO | WO 2011/039293 | 4/2011 |
| WO | WO 2013/004260 A1 | 1/2013 |
| WO | WO2013/098317 | 7/2013 |
| WO | WO2015/113960 | 8/2015 |
| WO | WO 2016/059060 | 4/2016 |

OTHER PUBLICATIONS

Agarwal et al.; "Adaptive Multi-Source Streaming in Heterogeneous Peer-to-Peer Networks;" SPIE Conf on Multimedia Computing and Networking (2005); 13 pages.
Bouten et al.; "QoE Optimization Through In-Network Quality Adaptation for HTTP Adaptive Streaming;" 8th International Conference on Network and Service Management (CNSM 2012): Mini-Conference; Las Vegas, Nevada (2012); pp. 346-342.
Hefeeda et al.; "CollectCast: A peer-to-peer service for media streaming;" Multimedia Systems (2005) 11(1): pp. 68-81.
International Search Report for PCT Application No. PCT/EP2015/073692; entitled: Managing Concurrent Streaming of Media Streams, dated Dec. 18, 2015; 13 pages.
Lederer et al.; "Towards Peer-Assisted Dynamic Adaptive Streaming over HTTP;" Proceedings of the 19th International Packet Video Workshop (PV 2012); Germany; May 2012; 6 pages.
Li et al.; "Network Friendly Video Distribution;" 3rd International Conference on the Network of the Future; 2012; Tunis, Tunisia; 8 pages.
Li et al.; "MUVIS: Multi-Source Video Streaming Service over WLANs;" Journal of Communications and Networks, vol. 7, No. 2; Jun. 2005; pp. 144-156.
Nguyen et al.; "Distributed Video Streaming Over Internet;" Proceedings of SPIE—The International Society for Optical Engineering; Mar. 2002; 10 pages.
Seo et al.; "An Experimental Study of Video Uploading from Mobile Devices with HTTP Streaming;" Proceedings of the 3rd Multimedia Systems Conference, Chapel Hill, North Carolina; Feb. 2012; 11 pages.
Stokking et al.; "Social Backup and Sharing of Video using HTTP Adaptive Streaming;" NEM Summit 2013—Implementing Future Media Internet towards New Horizons—Maximising the global value of Content, Media and Networks, Oct. 28-30, 2013, Nantes, France; 6 pages.

(56) References Cited

OTHER PUBLICATIONS

Written Opinion for Int'l Application No. PCT/US2015/073692, titled: Managing Concurrent Streaming of Media Streams, dated Dec. 18, 2015.
International Preliminary Report on Patentability for Int'l Application No. PCT/US2015/073692, titled: Managing Concurrent Streaming of Media Streams, dated Apr. 18, 2017.
Chakareski, J., et al., "Adaptive Multiview Video Streaming: Challenges and Opportunities," IEEE Communications Magazine, 94-100 (2013).
Chang, et al., "Real-Time Content-Based Adaptive Streaming of Sports Videos," IEEE, 139-146 (2001).
Cricri, F., et al., "Sensor-Based Analysis of User Generated Video for Multi-camera Video Remising," Advances in Multimedia Modeling: 18th International Conference, MMM 2012, 255-265 (2012).
Gao, B. et al., "Accurate and low-delay seeking within and across mash-ups of highly-compressed videos," *Proceedings of the 21st International Workshop on Network and Operating Systems Support for Digital Audio and Video*, New York, NY, pp. 105 (Jun. 1, 2011).
Jansen, J., et al., "Just-in-Time Personalized Video Presentations," Proceedings of the 2012 ACM symposium on Document Engineering, pp. 59-68 (2012).
Prarthana Shrestha et al., "Automatic mashup generation from multiple-camera concert recordings," *Proceedings of the International Conference on Multimedia*, New York, NY, pp. 541 (Oct. 25, 2010).
Saini, M., et al., "MoViMash: Online Mobile Video Mashup," Proceedings of the 20th ACM international conference on Multimedia, pp. 139-148 (2012).
Zhe Li et al., "Network friendly video distribution," *2012 Third International Conference on the Network of the Future (NOF)*, pp. 1-8 (Nov. 21, 2012).
Van Der Schaar M et al: "Fine-granularity-scalability for wireless video and scalable storage", Visual Communications and Image Processing; Jan. 21, 2002-Jan. 23, 2002; San Jose, pp. 805-816, (Jan. 21, 2002).
"Telecommunications and Internet converged Services and Protocols for Advanced Networking (TISPAN); Resource and Admission Control Sub-System (RACS): Functional Architecture; ETSI ES 282 003", ETSI Standard, European Telecommunications Standards Institute (ETSI), Sophia Antipolis Cedex, France, vol. TISPAN, No. V2.0.0, pp. 1-135 (May 1, 2008).

Dapeng Wu et al: "Scalable Video Coding and Transport over Broad-Band Wireless Networks", Proceedings of the IEEE, IEEE. New York, US, 89(1): 6-20 (Jan. 1, 2001).
Wenger, S., et al., "RTP Payload Format for SVC Video", Internet Draft from the IETF, p. 1-101 (Mar. 6, 2009).
Kofler I et al.: "Improving IPTV services by H.264/SVC adaptation and traffic control", Broadband Multimedia Systems and Broadcasting, 2009. BMSB '09 IEEE International Symposium On, IEEE, Piscataway, NJ, USA, May 13, 2009, pp. 1-6, (May 13, 2009).
"Telecommunications and Internet converged Services and Protocols for Advanced Networking (TISPAN); IPTV Architecture; IPTV Functions Supported by the IMS Subsystem" ETSI TS 182 027 V2.0.0; Feb. 2008, pp. 1-57.
Case, J., et al., "Introduction to Version 2 of the Internet-Standard Network Management Framework," Network Working Group, Request for Comments 1441, Apr. 1993, 14 pages.
Harrington, D. et al., "An Architecture for Describing SNMP Management Frameworks", Network Working Group, Request for Comments 2571, Apr. 1999. pp. 1-58.
Handley, M. et al., "SDP: Session Description Protocol", Network Working Group, Request for Comments 2327, Apr. 1998, pp. 1-40.
"3rd Generation Partnership Project: Technical Specification Group Services and System Aspects: Policy and Charging Control Architecture (Release 9)". 3GPP TS 23.203. V9.0.0. Mar. 2009. pp. 1-113.
Deering, S. et al., "Multicast Listener Discovery (MLD) for IPv6", Network Working Group. Request for Comments 2710. Oct. 1999. pp. 1-21.
Vida, R. et al., "Multicast Listener Discovery Version 2 (MLDv2) for IPv6", Network Working Group. Request for Comments 3810. Jun. 2004. pp. 1-62.
Holbrook, H. et al., "Using Internet Group Management Protocol Version 3 (IGMPv3) and Multicast Listener Discovery Protocol Version 2 (MLDv2) for Source-Specific Multicast", Network Working Group. Request for Comments 4604. Aug. 2006. pp. 1-12.
Calhoun, P. et al., "Diameter Base Protocol", Network Working Group. Request for Comments 3588. Sep. 2003. pp. 1-147.
Schulzrinne. H. et al., "Real Time Streaming Protocol (RTSP)", Network Working Group. Request for Comments 2326. Apr. 1998. pp. 1-86.
Schulzrinne, H. et al., "RTP: A Transport Protocol for Real-Time Applications", Network Working Group. Request for Comments 3550. Jul. 2003. pp. 1-98.
Rosenberg, J. et al., "Best Current Practices for Third Party Call Control (3pcc) in the Session Initiation Protocol (SIP)", Network Working Group. Request for Comments 3725. April 2004. pp. 1-32.

* cited by examiner

MANAGING CONCURRENT STREAMING OF MEDIA STREAMS

This application is the U.S. National Stage of International Application No. PCT/EP2015/073692, filed Oct. 13, 2015, which designates the U.S., published in English, and claims priority under 35 U.S.C. §§ 119 or 365(c) to European Application No. 14188767.9, filed Oct. 14, 2014. The entire teachings of the above applications are incorporated herein by reference.

FIELD OF THE INVENTION

The invention relates to a system and method for managing a concurrent streaming of media streams. The invention further relates to a streaming client for use with the system and method, and to a manifest for use by the streaming client. The invention further relates to a computer program product comprising instructions for causing a processor system to perform the method.

BACKGROUND ART

Recording devices such as digital cameras and mobile phones are ubiquitous nowadays. Accordingly, an event, such as a show, concert, game, etc., may be simultaneously recorded by multiple recording devices, thereby obtaining multiple recordings of the same event. Such multiple recordings may differ in various ways. For example, the recordings may show the event from different viewing positions. Another example is that the type of recording may differ, being, e.g., a video recording, a stereoscopic video recording, an audio recording, etc. The recordings may also differ in quality. For example, the recordings may differ in content quality, e.g., by having a (un)restricted viewing angle or (un)suitable distance to the event. The recordings may also differ in recording quality, e.g., by originating from recording devices with different technical capabilities, being encoded with different bitrates, etc.

The different recordings of the event may be made available by means of streaming. In such a case, the different recordings may be represented by a plurality of media streams, with the plurality of media streams being accessible from a respective plurality of streaming sources. Examples of media streams include video streams such as camera-recorded streams, audio streams such as microphone-recorded streams, and multimedia streams comprising different types of media streams. For example, when using a streaming client having access to the plurality of media streams, a consumer may manually select a media stream, e.g., to switch camera view.

A number of media streams of the event may be streamed concurrently. For example, a first media stream may be streamed to a first streaming client, or to a first group of streaming clients, and a second media stream may be concurrently streamed to a second streaming client, or to a second group of streaming client. Here, the term 'concurrent streaming' refers to the streaming overlapping or coinciding in time.

The concurrent streaming may be enabled by a resource having a resource limitation. For example, multiple media streams may pass through a network link which is bandwidth-limited. Disadvantageously, the resource limitation may affect the concurrent streaming in that it may cause a degradation in streaming quality. For example, the streaming of one or more of the media streams may be interrupted, or may not start at all. Another example is that, in case a media stream is encoded using scalable video coding, the streaming of the media stream may revert to a lowest bitrate.

A specific example which serves to illustrate the above may be a large live event, such as a major sports game or a music festival. Visitors of such an event may use their mobile devices to record the event from their viewpoint, and may wish to share their experience with their friends and family, or with the public at large. Conversely, users away from the event may wish to view their friend's recordings of the event, thereby sharing their experiences. However, it may be challenging to provide the visitors of such an event with good connectivity for their mobile devices, since cellular networks and local WiFi networks may become overloaded. As such, it may not be possible to concurrently stream all media streams being recorded at the event.

SUMMARY OF THE INVENTION

It would be advantageous to obtain a system or method for managing the concurrent streaming of media streams which better addresses resource limitations.

A first aspect of the invention provides a system and method for managing a concurrent streaming of media streams, the media streams comprising at least a first media stream and a second media stream, the first media stream and the second media stream representing different recordings of an event, the concurrent streaming of the media streams being enabled by a resource having a resource limitation.

The system may comprise:
an input interface for obtaining limitation data indicative of the resource limitation being exceeded by the concurrent streaming of, at least:
i) the first media stream streaming to a first streaming client, and
ii) the second media stream streaming to a second streaming client;
a selection subsystem for, based on the limitation data, generating selection data representing a selection of the first media stream for substituting the second media stream in the streaming to the second streaming client; and
an output interface for outputting the selection data for effecting the substituting of the second media stream by the first media stream in the streaming to the second streaming client.

The method may comprise:
obtaining limitation data indicative of the resource limitation being exceeded by the concurrent streaming of, at least:
i) the first media stream streaming to a first streaming client, and
ii) the second media stream streaming to a second streaming client;
based on the limitation data, generating selection data representing a selection of the first media stream for substituting the second media stream in the streaming to the second streaming client; and
outputting the selection data for effecting the substituting of the second media stream by the first media stream in the streaming to the second streaming client.

Another aspect of the invention provides a computer program product comprising instructions for causing a processing system to perform the method.

Embodiments are defined in the dependent claims.

The above aspects relate to the concurrent streaming of media streams including at least a first media stream and a second media stream. The media streams may be obtained from different streaming sources, but also from a single streaming source, while being streamed to different streaming clients. It is noted that although such different streaming clients may typically be represented by different devices, the different streaming clients may also be included in a single device, e.g., by being software clients, different instances of a software client, or different software threads each representing a client. The media streams may provide alternative recordings of a same event. The streaming may be live, thereby coinciding with the event itself. However, the media streams may also represent previous recordings of the event.

The concurrent streaming of the media streams may be enabled by a resource. The resource may have a resource limitation affecting the concurrent streaming of the media streams. For example, the resource may be a network segment of a media distribution network having a bandwidth limitation. Another example is that the resource may be transcoder for transcoding the media streams as part of the streaming, with the transcoder having a processing limitation. Yet another example is that the resource limitation may exist prior to, e.g., upstream of, the streaming of the media streams, such as in the readout of the media streams from a computer readable medium by a streaming source. It will be appreciated that various other types of resources and resource limitations are equally conceivable in media streaming.

Limitation data may be obtained which is indicative of the resource limitation being exceeded by the concurrent streaming of, at least, the first media stream streaming to a first streaming client and the second media stream streaming to a second streaming client. As such, the concurrent streaming of the media streams may be degraded in quality, e.g., by the streaming of the first media stream and/or the second media stream being interrupted, or not streaming at all. The limitation data may take various forms. For example, the limitation data may be represented by a direct signal from the resource itself upon, or imminently before, the resource limitation being reached. A specific example is that a node in a network segment may signal when its maximum bandwidth is reached. Another specific example is that a transcoder may signal when its maximum utilization is reached. However, the limitation data may also be merely indicative of the resource limitation being exceeded by the particular concurrent streaming in that it may, e.g., identify a maximum bandwidth or maximum available bandwidth due to other network traffic, with the bitrate of the media streams being known, or having been made known, to the system. As such, the limitation data may represent a resource limitation which is deemed to be exceeded by the concurrent streaming of the media streams, but which may currently not be exceeded yet due to the concurrent streaming not taking place yet, e.g., by being merely intended.

Based on the limitation data being indicative of the resource limitation being exceeded by the concurrent streaming of the media streams, selection data may be generated which represents a selection of one of the media streams for substituting another media stream in the streaming to a particular streaming client. Namely, the selection data may represent the selection of the first media stream for substituting the second media stream in the streaming to the second streaming client. Accordingly, the selection data may effectively represent a substitution selection. The substitution may apply to a streaming client originally streaming, or intending to stream, the media stream being now substituted. However, the substitution may also affect more streaming clients streaming, or intending to stream, the particular media stream. In this respect, it is noted that the term 'substitution' may refer to the streaming of the original media stream ceasing, and the streaming of the selected media stream starting.

Having generated the selection data, the selection data may be output from the selection subsystem so as to effect the substituting of the second media stream by the first media stream in the streaming to the second streaming client. As will be elucidated in reference to the embodiments, various options exists for the effectuation.

The above measures provide a system which may effectively function as a streaming manager in that the system may monitor or pre-emptively analyze the concurrent streaming of media streams and, if needed in view of a resource limitation of a resource being exceeded, effect one or more substitutions of media streams in the concurrent streaming so as to avoid the resource limitation being exceeded. Namely, when the selection data represents the selection of the first media stream for substituting the second media stream in the streaming to the second streaming client, the substitution typically reduces the resource allocation since the first media stream is already being streamed, or being intended for streaming, to the first streaming client. As such, after substitution, both the first streaming client and the second streaming client may stream the same media stream rather than different media streams. The streaming of a same media stream to different streaming clients typically represents a lower resource allocation than the streaming of different media streams to different streaming clients. For example, only one readout or transcoding operation may be required. Another example is that, when using multicasting or similar techniques, the streaming of a same media stream to different streaming clients may require less bandwidth than the streaming of different media streams to different streaming clients.

The invention as claimed is based in part on the recognition that a substitution of a media stream may be preferred over a degradation in streaming quality which would otherwise occur. Namely, the first media stream substituting the second media stream may still provide a satisfactory experience of the event since it merely represents a different recording of the event. Accordingly, an advantage may be that, instead of the streaming being interrupted, a user may still experience the event. Another advantage may be that the resource is better managed so as not to exceed the resource limitation, which may otherwise potentially affect the resource itself.

In an embodiment, the selection subsystem may be configured for generating the selection data further based on a selection criterion, the selection criterion being indicative of the substituting of the second media stream by the first media stream in the streaming to the second streaming client being preferred over another substitution in the concurrent streaming of the media streams. There may exist multiple options for substitution in the concurrent streaming of the media streams. For example, the first media stream may substitute the second media stream in the streaming to the second streaming client, or alternatively, the second media stream may substitute the first media stream in the streaming to the first streaming client. By employing a selection criterion in generating the selection data, the selection subsystem may perform a purposeful, e.g., non-random, selection, namely one which is at least in partial accordance with the selection criterion. Such purposeful selection may enable the selection subsystem to mitigate smaller disadvantages which may be associated with the substitution. For example, the selection subsystem may give preference to substitutions of similar media streams so as to avoid the user noticing, or being bothered by, the substitution of one media stream by another media stream.

In an embodiment, the selection subsystem may be further configured for:

assigning each of the media streams a quality score based on the selection criterion, thereby obtaining a plurality of assigned quality scores, and generating the selection data based on the assigned quality scores to enable the substituting of the second media stream by the first media stream in the streaming to the second streaming client to be selected over another substitution based on a comparison of the plurality of assigned quality scores.

The selection criterion may be used to assign a quality score to each of the media streams, and thereby implicitly also to a respective streaming source from which a particular media stream is available. Accordingly, each media stream may be rated, e.g., on a quality scale, which may allow a quality comparison between the media streams. Effectively, the quality score may then represent the preference expressed by the selection criterion. For example, when the selection criterion favours media streams having a high bitrate, a high quality score may be assigned to such media streams. Accordingly, when determining which media stream is to be selected, use may be made of the plurality of quality scores in that a media stream may be selected which has been assigned a highest quality score, or in general, a sufficient quality score.

In an embodiment, the media streams may comprise concurrent portions representing concurrent time periods of the event, and the selection subsystem may be further configured for assigning the quality score to each of the media streams on a per-portion-basis. Here, the term 'concurrent portions' may refer to parts of the respective media streams which correspond to a common time period of the event. As such, the concurrent portions may constitute alternative recordings for said period in time. It is noted that the concurrent portions may be explicitly present in the respective media streams, e.g., by the media streams being segmented. However, this does not need to be the case in that the media streams may equally constitute non-segmented media streams. Also, in the case of segmented media streams, the segments do not need to be of the same length and/or synchronised. Rather, it may suffice that the segments overlap in event time and thereby comprise concurrent portions. The selection criterion may be used to assign a quality score to each of the concurrent portions, and thereby implicitly also assigning the quality score to a respective streaming source from which a particular media stream is available. Accordingly, each concurrent portion may be rated, e.g., on a quality scale, which may allow a selection to be performed between the concurrent portions based on a comparison of the assigned quality scores. Effectively, the quality scores may implicitly already represent the selection in that a media stream may be selected of which the concurrent portion has been assigned a highest quality score, or in general, a sufficient quality score.

In an embodiment, the quality score may be assigned based on a number of selection criteria. For example, the quality score may represent a weighted average of the preference expressed by each of the number of selection criteria.

In an embodiment, the selection criterion may be at least one of:

a resource criterion giving preference to a substitution which reduces a resource allocation of the resource further than another substitution, a client criterion giving preference to a substitution which affects a selected streaming client or a selected group of streaming clients less than another substitution, a source criterion giving preference to a substitution which affects the streaming of a media stream from a streaming source less than another substitution, a stream criterion giving preference to a substitution of a media stream being streamed to a smaller number of streaming clients than another media stream, and a similarity criterion giving preference to a substitution of a media stream by another media stream being similar in quality, time alignment, and/or geographical recording location.

Accordingly, the resource criterion may bias the selection subsystem towards substitutions which reduce the resource allocation of the resource further than other substitutions. The client criterion may bias the selection subsystem towards substitutions which lesser affect a selected streaming client or a selected group of streaming clients. For example, the client criterion may indicate that a streaming client is not to be subjected to substitutions. The source criterion may bias the selection subsystem towards substitutions which affect a particular streaming source to a lesser degree. The stream criterion may bias the selection subsystem towards substituting media streams which are streamed to a smaller number of streaming clients. The similarity criterion may give preference to substitutions of similar media streams, e.g., with the media stream to be substituted being more similar to the selected substitute media stream than another potential substitute media stream. The above selection criteria may be combined. It is noted that, in general, a selection criterion may affect the selection of the first media stream and/or the second media stream, i.e., the media stream to be substituted and/or the media stream intended as a substitute.

In an embodiment, the resource limitation may be at least one of:

a bandwidth limitation in the concurrent streaming of the media streams across a network segment, a readout limitation in the readout of the media streams from a computer readable medium, and a processing limitation in the processing of the media streams.

The abovementioned types of resource limitations may occur frequently in media streaming. However, this is not a limitation, in that various other types of resources and resource limitations are equally conceivable in media streaming.

In an embodiment, the second streaming client may be provided with a manifest, the manifest comprising address information for enabling the second streaming client to access the media streams, and wherein:

the selection data may be generated to enable the second streaming client to select the first media stream from the manifest;

the output interface may be configured for providing the selection data to the second streaming client.

Within the field of streaming of media streams, it is known to provide a streaming client with a manifest. The manifest may take form as, e.g., a file, a metadata stream or other types of data. The manifest may identify different media streams and their address information, e.g., from which streaming source the respective media stream may be accessed. In this embodiment, the streaming client may be provided with a manifest which enables the streaming client to access a plurality of streaming sources, and as such the media streams provided by said streaming sources. By generating the selection data in the claimed manner, the streaming client may be enabled to identify from the manifest which streaming source is to be accessed in order to access the selected media stream for substituting a currently accessed media stream. An advantage of this embodiment may be that the streaming client may directly access the selected streaming source. Accordingly, it is not needed for the system to be involved in the delivery of (portions of) media streams. A further advantage may be that the actual selection may be performed by the streaming client, thereby enabling the streaming client to take other, e.g., local, considerations into account. Moreover, use may be made of existing manifests and their delivery mechanisms. Hence, it may suffice to only additionally provide the selection data to the streaming client.

In an embodiment, the output interface may be configured for formatting the selection data as a metadata stream. By formatting the selection data as a metadata stream, the selection data may be delivered to the streaming client in a similar manner as the media streams themselves, namely in the form of a stream. Optionally, when providing the streaming client with a manifest, the manifest may be generated so as to include address information for enabling the streaming client to access the metadata stream. An advantage of this embodiment may be that existing delivery mechanisms may be re-used, such as those for the delivery of metadata streams in MPEG-4 Part 14. Here, only a new stream identifier may have to be declared to identify the metadata stream comprising the quality scores. Accordingly, this may avoid the need for an additional delivery mechanism for delivering the selection data to streaming client(s).

In an embodiment, the media streams may comprise concurrent portions representing concurrent time periods of the event, the selection subsystem may be configured for generating a manifest for the second streaming client, and the manifest may comprise a playlist identifying different portions of the media streams for being consecutively accessed, at least one of the different portions having been selected based on the selection data. In this embodiment, the system may itself effect the substitution of media streams by providing a playlist which represents this substitution to the streaming client, rather than delivering the selection data itself. For example, the playlist may consecutively identify portions which have been assigned a suitable quality score. Accordingly, the streaming client may obtain a streaming presentation of the event by accessing the plurality of streaming sources in accordance with the playlist.

In an embodiment, the system may be configured as a streaming proxy between at least the second streaming client and at least a streaming source providing the first media stream, in which the system may be configured for streaming the first media stream to the second streaming client in accordance with the selection data. Accordingly, rather than having to deliver the selection data itself to the streaming client, the system may select and subsequently deliver the selected media stream, or portion thereof, to the streaming client. Namely, the system may be a streaming proxy, or may comprise a proxy subsystem enabling the system to act as a streaming proxy. An advantage of this embodiment may be that the streaming client may be provided with a media stream obtained by dynamically switching between media streams, without the streaming client having to be involved or even aware of such dynamic switching. A further advantage may be that it is not needed to provide the selection data to the streaming client, thereby avoiding a need for a delivery mechanism.

Another aspect of the invention provides a streaming client for use with the system, wherein the streaming client may be configured for obtaining a manifest, the manifest comprising address information for enabling the streaming client to access a plurality of streaming sources, and wherein the streaming client may further comprise:

an input for receiving the selection data from the system, the selection data representing the selection of one of the media streams; and a processing subsystem configured for:

i) based on the selection data, selecting from the manifest one of the plurality of streaming sources which provides access to the selected media stream; and ii) accessing the selected media stream from said streaming source.

Accordingly, a streaming client is provided which may be configured for obtaining selection data from the system, e.g., in the form of quality scores, and for subsequently effecting the substitution based on the selection data.

Another aspect of the invention provides a manifest for a streaming client, wherein the manifest may comprise address information for enabling the streaming client to access selection data as generated by the system. Accordingly, in addition to other information, such as address information to the plurality of streaming sources, the manifest may comprise address information to the selection data. Therefore, a streaming client obtaining the manifest may be enabled to access the selection data.

In an embodiment, the selection data may comprise at least part of the plurality of quality scores. Accordingly, the streaming client may be directly provided with quality scores. In this embodiment, the streaming client may match the quality scores to the respective streaming sources, as identified in a manifest, in order to determine which streaming source and thus which media stream is to be accessed. For example, when using MPEG Dynamic Adaptive Streaming over HTTP (DASH), a MPEG-DASH client may in effect be 'trusted', or alternatively be explicitly instructed, to effect the substitution by making use the plurality of quality scores.

In an embodiment, the client interface may be configured for providing the selection data to the streaming client via a signalling channel. By providing the selection data to the streaming client via a signalling channel, it is not needed to rely on existing delivery mechanisms for said delivery. Accordingly, the selection data may be provided to the streaming client even if the standard used for streaming the plurality of media streams does not explicitly provide for a delivery mechanism for such selection data to be delivered. For example, when using MPEG Dynamic Adaptive Streaming over HTTP (DASH), such a signalling channel may be used to deliver the selection data even if MPEG-DASH does not provide for a suitable delivery mechanism.

In an embodiment, the selection data may be provided asynchronously from providing the manifest to the streaming client. By delivering the selection data asynchronously with the manifest, their delivery is decoupled in time.

In an embodiment, the selection data may further comprise association information for enabling the streaming client to associate the plurality of quality scores with the plurality of streaming sources. As such, the streaming client may be provided with information which enables said quality scores to be associated with the plurality of streaming sources. Such association information may be explicit or implicit. An example of the latter may be an ordering of the plurality of quality scores which matches that of the address information of the streaming sources in the manifest.

In an embodiment, the selection subsystem may be configured for updating the manifest for a new concurrent portion. This embodiment takes into account that during streaming, it may not be possible to generate a manifest for an entire media stream as the resource allocation of the resource in the future may still be unknown. Accordingly, the manifest may be updated over time.

In an embodiment, the selection subsystem may be configured for, when generating the selection data, omitting selecting the first media stream for substituting the second media stream in the streaming to the second streaming client when a difference in quality score between the first media stream and the second media stream is below a quality threshold, or, in case of the media streams comprising concurrent portions representing concurrent time periods of the event, a length of the concurrent portion being below a length threshold. This embodiment takes into account that it may not always be desirable to switch to another media stream even though its concurrent portion has been assigned a suitable quality score. Namely, when a length of the concurrent segment or a difference in quality with the concurrent portion of a currently accessed media stream is below a respective threshold, the disadvantages of such switching may outweigh the advantage in terms of streaming quality. Accordingly, the substitution of one media stream by another media stream may be omitted.

In an embodiment, at least one of the plurality of media streams may be received in non-segmented form, and the system may be configured for segmenting said media stream. By segmenting said media stream, a natural granularity is established for dynamically switching between media streams. It is therefore convenient to, on a segment-by-segment basis, switch between media streams to obtain those segments which have been assigned a suitable quality score.

Another aspect of the invention provides a manifest for a streaming client, the manifest comprising address information for enabling the streaming client to access selection data as generated by the system.

In accordance with the above, a system and method may be provided for managing a concurrent streaming of a first media stream and a second media stream. The media streams may represent different recordings of an event. The concurrent streaming of the media streams may be enabled by a resource having a resource limitation. To address this resource limitation, when it is determined that the resource limitation may be exceeded by the concurrent streaming of the first media stream streaming to a first streaming client and the second media stream streaming to a second streaming client, the first media stream may be selected for substituting the second media stream in the streaming to the second streaming client. As a result of the substitution, the first and the second streaming client may stream the same media stream rather than different media streams. This may have as advantage that the allocation of the resource is reduced, since the streaming of a same media stream to different streaming clients typically represents a lower resource allocation than the streaming of different media streams to different streaming clients.

It will be appreciated by those skilled in the art that two or more of the above-mentioned embodiments, implementations, and/or aspects of the invention may be combined in any way deemed useful.

Modifications and variations of the method, the computer program product, the streaming client and/or the manifest, which correspond to the described modifications and variations of the system, can be carried out by a person skilled in the art on the basis of the present description.

The invention is defined in the independent claims. Advantageous yet optional embodiments are defined in the dependent claims.

BRIEF DESCRIPTION OF THE DRAWINGS

These and other aspects of the invention are apparent from and will be elucidated with reference to the embodiments described hereinafter. In the drawings.

Figure 1:
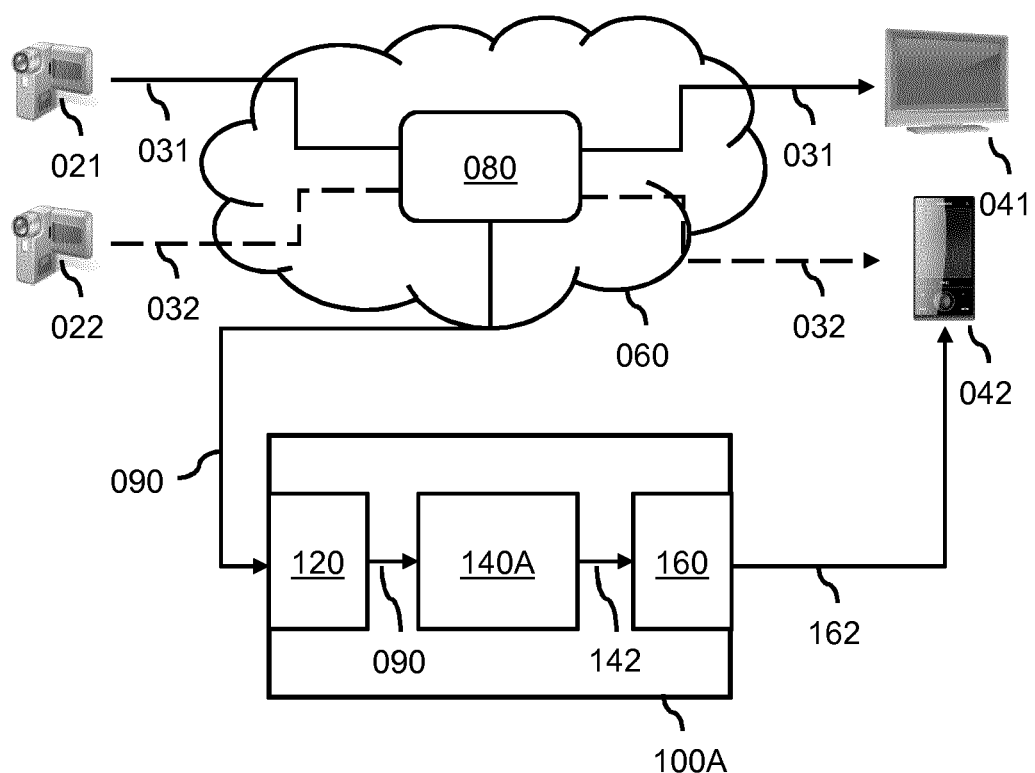
FIG. 1 shows an embodiment of a system for managing a concurrent streaming of at least a first media stream and a second media stream across a network segment, the network segment comprising a resource having a resource limitation.

It should be noted that items which have the same reference numbers in different Figures, have the same structural features and the same functions, or are the same signals. Where the function and/or structure of such an item has been explained, there is no necessity for repeated explanation thereof in the detailed description.

LIST OF REFERENCE NUMERALS

The following list of reference numbers is provided for facilitating the interpretation of the drawings and shall not be construed as limiting the claims.

020 plurality of streaming sources;
021 first streaming source;
022 second streaming source;
031 first media stream;
032 second media stream;
040 plurality of streaming clients;
041 first streaming client;
042 second streaming client;
060 network segment;
080 resource having resource limitation;
081 wireless access point;
082 network processor;
083 digital subscriber line modem;
084 first network node;
085 second network node;
086 cellular base station;
090 limitation data;
091 resource limitation in wireless communication;
092 resource limitation in network processor;
093 resource limitation in digital subscriber line;
094 resource limitation in home network;
095 resource limitation in core network;
096 resource limitation in cellular communication;
100A-E embodiments of system for managing concurrent streaming;
120 input interface;
140A,D,E embodiments of selection subsystem;
142 selection data;
160 output interface;
162 communication with streaming client(s);
164 communication with streaming client(s) via signalling channel;
170 manifest;
172 description of segments of available media streams;
174 description of metadata stream;
180 cache;
200 method for managing concurrent streaming;
210 obtaining limitation data;
220 generating selection data representing selection of media stream;
230 outputting selection data;
250 computer program stored as non-transitory data.
260 computer readable medium;

DETAILED DESCRIPTION OF EMBODIMENTS

FIG. 1 shows an embodiment of a system 100A for managing a concurrent streaming of media streams. Such media streams may be accessible from streaming sources 021-022, and may represent different recordings of an event. In the example of FIG. 1, the concurrent streaming may involve a first streaming source 021 streaming a first media stream 031 to a first streaming client 041 and a second streaming source 022 streaming a second media stream 032 to a second streaming client 042. FIG. 1 shows the former as a solid line, and the latter as a dashed line. It is noted that the concurrent streaming may also involve more media streams being streamed to respective streaming clients. The concurrent streaming of the media streams 031-032 may be enabled by a resource. In the example of FIG. 1, the resource is a network element 080 of a network segment 060 through which the first and second media streams 031-032 may stream. The resource may have a resource limitation. For example, the network element 080 may have a limited internal or external bandwidth, e.g., towards other network elements, or a limited internal processing capacity. The concurrent streaming as depicted in FIG. 1 may exceed this resource limitation. As a consequence, the concurrent streaming may not start at all, may be regularly or irregularly interrupted or, in general, may have a sub-optimal streaming quality.

The system 100A may address the resource limitation of the resource 080 by managing the concurrent streaming. For that purpose, the system 100A may comprise an input interface 120 for obtaining limitation data 090 indicative of the resource limitation being exceeded by the concurrent streaming of, at least, the first media stream 031 streaming to the first streaming client 041 and the second media stream 032 streaming to the second streaming client 042. In the example of FIG. 1, the input interface 120 is shown to obtain the limitation data 090 directly from the resource, e.g., the network element 080. For example, the network element 080 may directly report its current utilization to the system 100A. It is noted that other forms of limitation data are equally conceivable and will be elucidated with reference to FIG. 5.

The system 100A may further comprise a selection subsystem 140A for, based on the limitation data 090, generating selection data 142 representing a selection of the first media stream 031 for substituting the second media stream 032 in the streaming to the second streaming client 042. Moreover, the system 100A may comprise an output interface 160 for outputting the selection data so as to effect the substituting of the second media stream 032 by the first media stream 031 in the streaming to the second streaming client 042. Various options exist for said effecting, as will be further elucidated with reference to FIGS. 4, 8 and 9. In the example of FIG. 1, the output interface 160 is shown to be a client interface for communicating with the streaming clients 041-042, and in particular, with the second streaming client 042, so as to effect the substituting of the second media stream 032 by the first media stream 031 in accordance with the selection data 142. For example, the selection data 142 may represent instructions for the second streaming client 042 to start streaming the first media stream 031 from the first streaming source 021, and optionally may further represent instructions for the second streaming client 042 to cease streaming the second media stream 032 from the second streaming source 022. It is noted that it may not be needed to explicitly instruct the second streaming client 042 to cease streaming the second media stream 032. Namely, the second streaming client 042 may not have started streaming the second media stream 032 yet, or in case such streaming did start already, may automatically cease when starting to stream the first media stream 031.

Figure 2:
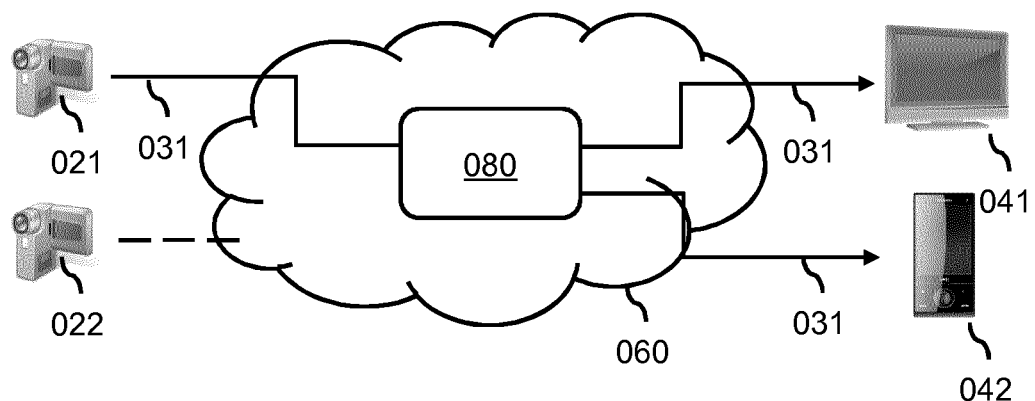
FIG. 2 illustrates the second media stream being substituted by the first media stream in the streaming to a streaming client in accordance with selection data generated by the system, thereby reducing an allocation of the resource.

FIG. 2 shows a result of the substitution having been effected in accordance with the selection data. Namely, in addition to the first streaming client 041, also the second streaming client 042 is shown to stream the first media stream 031 from the first streaming source 021, rather than streaming the second media stream 032 from the second streaming source 022. Accordingly, the resource 080 may not need to enable the streaming of the second media stream 032 to the second streaming source 022, e.g., by transporting or processing the second media stream 032, but rather only the first media stream 031. Since the resource 032 already enables the streaming of the first media stream 032 to the first streaming client 041, the latter may represent a lower allocation of the resource 080. For example, if the resource 080 is involved in processing media streams, only the first media stream 031 may be processed rather than the first media stream 031 and the second media stream 032. Similarly, only the first media stream 031 may be received from the first streaming source 021 rather than the resource 080 also having to receive the second media stream 032 from the second streaming source 022. Accordingly, the allocation of the resource 080 may be reduced. As a consequence, the concurrent streaming may start or resume, may be less or substantially not at all interrupted, or, in general, may have a better streaming quality.

It is noted that, in general, the streaming clients may comprise TVs, DVB players and recorders, mobile (smart) phones, cameras, digital radio's, music (MP3) players, PCs, laptops, tablets, smart-watches, smart-glasses, set-top boxes, media players, car hi-fi installations, professional audio and video equipment, etc.

Moreover, by way of example, FIGS. 1-2 show the streaming sources being recording devices which comprise audio-visual sensors. Examples of such recording devices include smartphones, compact cameras, professional cameras, smart-watches, smart-glasses, etc. However, this is not a limitation in that the streaming sources may also comprise other types of devices or systems, such as streaming servers which by themselves are unable to record the event but rather enable such recordings to be streamed as media streams. Another example is a stream buffer which buffers a media stream within a media distribution network.

Figure 3A:
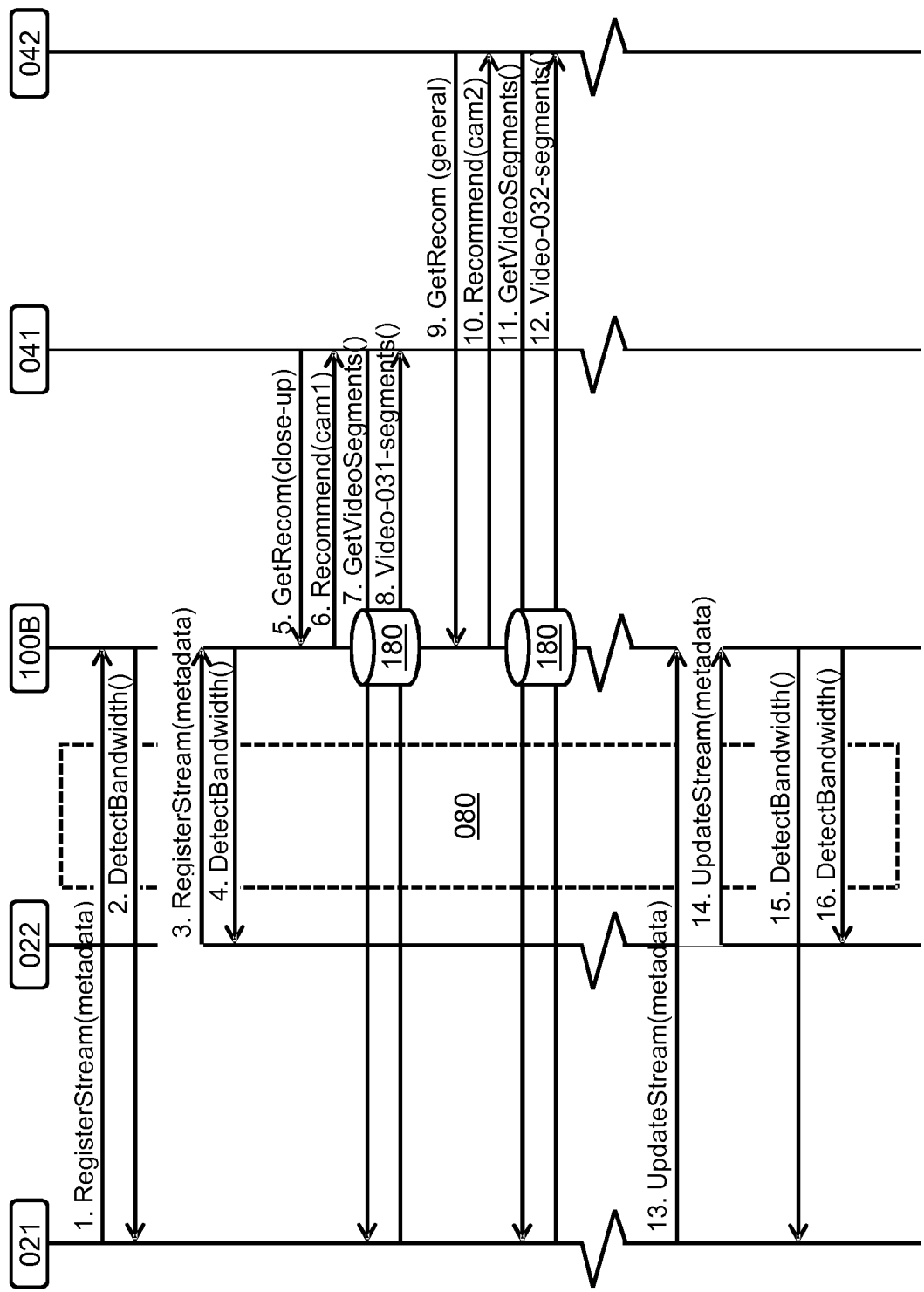
FIGS. 3A and 3B together show a message exchange illustrating the managing of the concurrent streaming of media streams by the system.
Figure 3B:
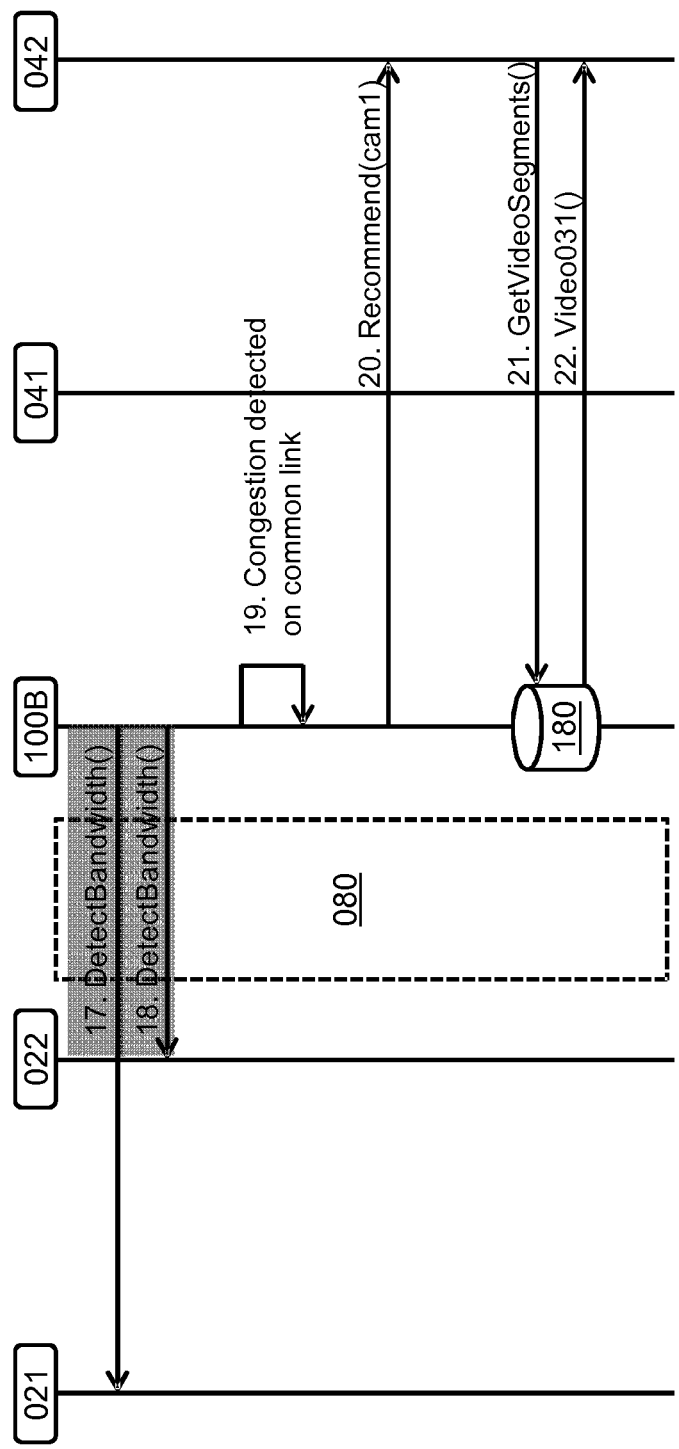

FIGS. 3A and 3B illustrate a message exchange between an embodiment of the system 100B, a first streaming source in the form of a first camera 021, a second streaming source in the form of a second camera 022, a first streaming client 041 and a second streaming client 042, with the message exchange resulting in a substitution in the streaming of video segments to the second streaming client 042. In the example of FIGS. 3A and 3B, the streaming clients 041-042 are shown to retrieve video content from two cameras 021 and 022. This video content is shown to stream through a network node 080 being a potential bottleneck for the video distribution.

In the example of FIGS. 3A and 3B, the system 100B is embodied as a video recommender 100B which comprises a cache 180 for caching video segments from the first camera 021 and the second camera 022. The video recommender 100B may be used in a service to provide user-generated videos of an event such as a major sports game or concert. The user-generated videos may serve as background or augmentation to a main video stream such a television broadcast. Initially, the cameras 021-022 may register their availability to the video recommender 100B in steps 1 and 3, namely using a registration message 'RegisterStream (metadata)'. The registration message may include metadata, e.g., to indicate a location or focus with respect to the event, a quality or potential quality of the user-generated video, e.g., indicating occlusion, lighting circumstances, etc. After registration, the video recommender 100B may in steps 2 and 4 start bandwidth monitoring, as represented conceptionally by a message 'DetectBandwidth( )'. This bandwidth monitoring may also include detecting network routes the video content may take, e.g., the network route from the first camera 021 and the second camera 022 to the video recommender 100B.

In step 5, the first streaming client 041 may request a background video from the video recommender 100B, namely a close-up shot, by way of a message 'GetRecom (close-up)'. The video recommender 100B may recommend the first camera 021 to the first streaming client 041 using a message 'Recommend(cam1)', as the metadata of this camera may indicate that it is close to the event. The first streaming client 041 may proceed by retrieving the video from the first camera 021 using a message 'GetVideoSegments( )'. In this example, the retrieving may involve a type of HTTP adaptive streaming. As such, the first streaming client 041 may retrieve, over time, all segments of the video from the first camera 021. The first camera 021 may deliver these segments upon request, together forming a first video stream 031.

In substantially the same manner, namely by way of steps 9 to 12, the second streaming client 042 may request more general background video from the video recommender 100B, and in response, may be recommended the second camera 022. This may be due to, e.g., the quality of this camera being highest at that moment in time, for example by having a highest resolution, a better focus, better lighting conditions, etc. The second streaming client 042 may thus retrieve segments of the video from the second camera 022, together forming a second video stream 032.

In between the cameras 021-022 and the video recommender 100B, there may be a network node 080 through which all data traffic passes. Furthermore, in between the network node 080 and the streaming clients 041-042, there may be cache 180, e.g., implemented at or near the video recommender 100A. The cache 180 may enable caching and multicasting of video segments passing through.

Steps 13 and 14 involve the cameras 021-022 sending updates on their status to the video recommender 100B, by way of a message 'UpdateStream(metadata)'. These updates may be about changes in quality, e.g., occlusion, lighting conditions. The video recommender 100B may continue monitoring the available bandwidth on the network links from the cameras 021-022 to the video recommender 100B, as represented conceptionally in FIG. 3A by a message 'DetectBandwidth' being sent to the cameras 021-022 in steps 15 and 16.

FIG. 3B forms a second part to FIG. 3A in that it illustrates the video recommender 100B detecting, in step 19, a congestion on a common link for the video streams 031-032. This congestion may denote that the concurrent streaming of the video streams 031-032 may be affected. Namely, even if there may be sufficient bandwidth for one of these video streams, e.g., 80% of the bandwidth needed for both video streams, nevertheless the concurrent streaming of both video streams may be affected. For example, both video streams may obtain 20% less bandwidth than needed (=10% ((100%−80%)/2)) out of 50% (100%/2)). Accordingly, having detected the congestion, the video recommender 100B may instruct the second streaming client 042 to start streaming from the first camera 021 by sending a message titled 'Recommend(cam1)' to the second streaming client 042. This recommendation may effects a substitution which may be considered acceptable by a viewer since the close-up provided by the first camera 021 may also constitute general background video. The first camera 021 may even provide better quality video. As such, the second streaming client 042 may follow this recommendation and may request segments from the first camera 021 and stop retrieving new segments from the second camera 022.

Since the first video stream 031 passes through the cache 080, the cache 080 may now deliver the segments of first video stream 031 to both the first streaming client 041 and the second streaming client 042. This may relieve the burden of carrying both video streams 031-032 from the network node 080, which now may only have to pass the first video stream 031, thereby alleviating the congestion problem.

Figure 4:
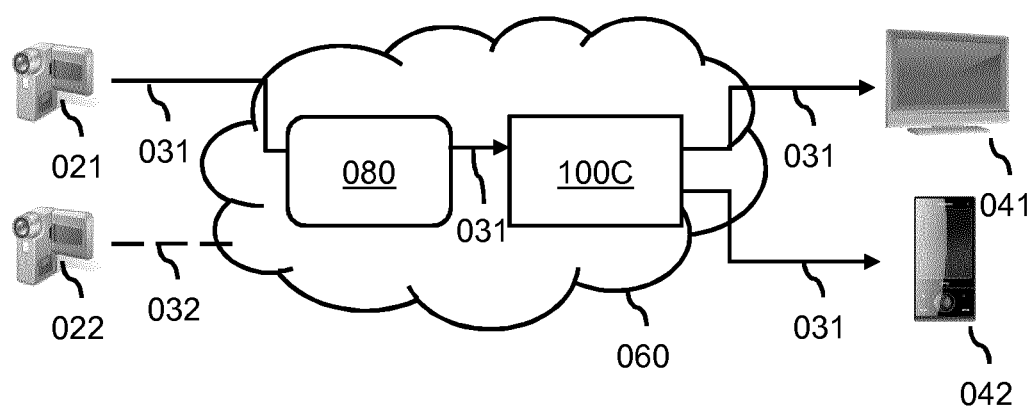
FIG. 4 shows a further embodiment of the system for managing the concurrent streaming of media streams, the system being configured for acting as a streaming proxy between streaming sources and streaming clients.

FIG. 4 shows a further embodiment of a system for managing the concurrent streaming of media streams. Here, the system 100B may be configured for acting as a streaming proxy between the streaming sources 021-022 and the streaming clients 041-042. Namely, instead of outputting the selection data directly to the streaming clients 041-042, and in particular to the second streaming client 042, the selection data may be internally used by the system 100B, e.g., by being output to a stream selector (not shown in FIG. 4) to select the first media stream 031 rather than the second media stream 032 for being relayed to the second streaming client 042. As such, the system 100B may act as a streaming proxy which effects the substitution by streaming the first media stream 031 rather than the second media stream 032 to the second streaming client 042 in accordance with the selection data. This selection by the system 100B may cause the resource 080 located upstream of the system 100B not having to enable the streaming of the second media stream 032 to the second streaming client 042 but rather only the streaming of the first media stream 031. Accordingly, as in the case of the system 100A of FIGS. 1 and 2, the allocation of the resource 080 may be reduced. It is noted that a similar reduction may be obtained when the resource 080 is located downstream of the system 100B, for example, when the resource allocation represented by the streaming of the first media stream 031 is lower than the resource allocation represented by the streaming of the second media stream 032.

It is noted that, even if, on an individual stream basis, the resource allocation caused by the streaming of the second media stream were to be similar or higher than the resource allocation caused by the streaming of the first media stream, the substitution may nevertheless result in an overall lower resource allocation, e.g., due to use of multicasting or similar techniques in which streaming of a same media stream to an additional streaming client does not substantially increase the resource utilization, by processing results for the streaming of a media stream to the first streaming client being re-used for the streaming to the second streaming client, etc.

With further reference to FIG. 4, it is noted that it may occur that the different media streams are misaligned with respect to a timeline of the event, e.g., by being received non-synchronously from the streaming sources. In such a case, the system may employ inter-stream synchronization techniques, as known per se from the field of media synchronization, to ensure temporal alignment of the different media streams, thereby establishing a degree of concurrency between the media streams. If explicitly segmented streams are being received which have unequal segment durations, synchronization of the received segments or re-segmentation may be performed, or some temporal misalignment may be accepted. It is noted that the alignment may not need to be perfect, e.g., frame-accurate as would typically be the case for alignment of audio data with video data. Namely, since the media streams represent different recordings of the event, a certain degree of temporal misalignment may be allowable, e.g., be acceptable to a consumer. This may result in a duration of the streaming media presentation which may be longer than the duration of the event being recorded. It is noted that current adaptive streaming standards such as MPEG-DASH support temporally aligned segments as well as temporally non-aligned segments.

Figure 5:
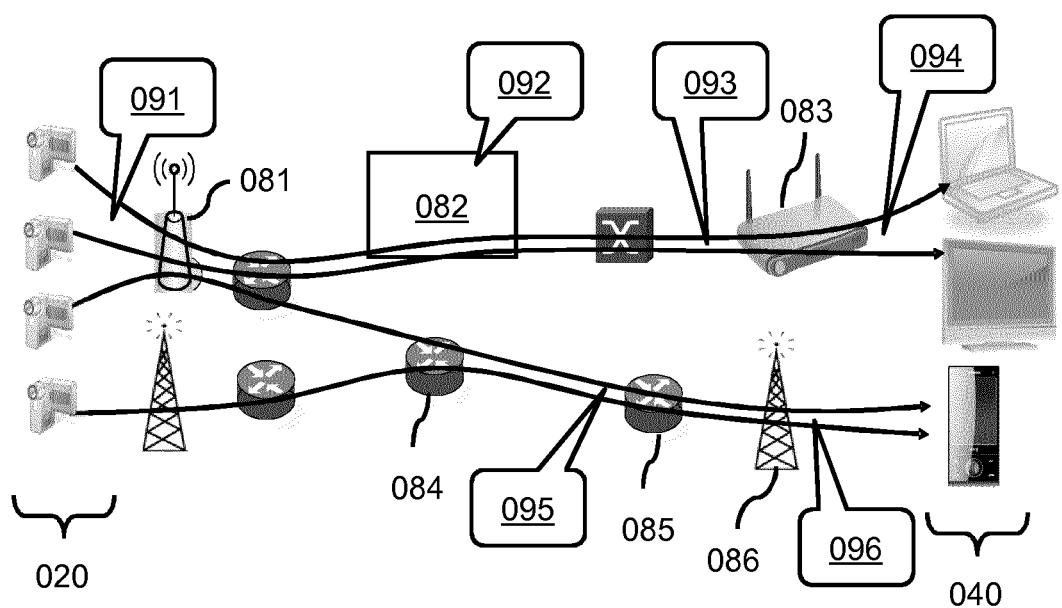
FIG. 5 illustrates various types of resource limitations which may occur in the concurrent streaming of media streams from streaming sources to streaming clients.

FIG. 5 illustrates various types of resource limitations 091-096 which may occur in the concurrent streaming of media streams from streaming sources 020 to streaming clients 040. Namely, as the media streams are transported through a network (shown in FIG. 5 as solid lines connecting the streaming sources 020 to the streaming clients 040), the media streams may be transported across network links between the various network elements 081-086. A particular network link may represent a shared bottleneck in case the network link were to transport a plurality of media streams while having insufficient available bandwidth for such transport. Here, 'shared' refers to the bottleneck being caused or aggravated by more than one media stream being streamed across the network link. Accordingly, such a network link may represent a resource having a resource limitation in the form of a bandwidth limitation.

FIG. 5 specifically shows various types of bandwidth limitation which may occur across a network. For example, in an ingest wireless part 091 of the network, e.g., connecting the streaming sources 020 to the network via a wireless access point 081, wireless bandwidth may be limited and multiple devices may contend for this wireless bandwidth. The shared bottleneck may also occur elsewhere, e.g., in a network link 095 between two network nodes 084-085 in a core of the network. The shared bottleneck may also occur in an egress part of the network. For example, if multiple users in one household would like to access different media streams of the same event, there may be a shared bottleneck on the Digital Subscriber Line (DSL) link 093 to the household, or in the home network 094 downstream of a DSL modem 083. Yet another example is that the shared bottleneck may occur in cellular communication 096 between a cellular base station 086 and one or more streaming clients 040. FIG. 5 also illustrates another type of resource limitation in the form of a network processor 082 having a processing limitation 092. An example of a network processor 082 is a transcoder which may have limited processing capacity in that transcoding may be limited to a certain number of concurrent streams at the same time. Moreover, although not shown in FIG. 5, the resource limitation may also take another form, such as a limitation in the readout of the media streams from a computer readable medium.

It is noted that, in general, the limitation data may be externally provided. A specific example is that the resource itself may report various information to the system which is indicative of the resource limitation of the resource being exceeded by the concurrent streaming of the media streams. However, the limitation data may also represent an estimate or measurement of the system itself, e.g., as obtained by a limitation discovery subsystem. In general, obtaining such limitation data may involve 1) detecting that there is a resource limitation affecting the concurrent streaming, e.g., that there is a 'problem', 2) identifying a location of the resource limitation, and 3) identifying the resource limitation itself, e.g., its value, the type of limitation, etc.

Detecting that there is a resource limitation affecting the concurrent streaming may take place in various ways. For example, a streaming source may detect a problem when a media stream is not streaming out correctly. The system itself may also detect a problem. For example, if the system acts as streaming proxy, the system may detect a problem in the same manner as a streaming client would, e.g., by the concurrent streaming being interrupted, having a sub-optimal quality, detecting packet loss or malformed packets, etc. Detecting a sub-optimal quality of the concurrent streaming may take place in various ways, e.g., by analysing metadata of a media stream which describes the quality, by analysing its video and/or audio content, etc. A (network) management system may also detect a problem, e.g., by reporting congestion on network links that are known to carry media streams. A streaming client may detect a problem when a media stream is not arriving correctly. For that purpose, the streaming client may, e.g., monitor the buffer occupancy level, monitor the decoding process, through user feedback, etc. In this respect, it is noted that although ideally it is to be avoided that a problem is detected only when it already occurs at a streaming client, it may nevertheless be still desirable in that solving the problem late may be preferred over the concurrent streaming continuing to have suboptimal quality.

Identifying a location of the resource limitation may also take place in various ways. For example, in case of the resource being a network link representing a shared bottleneck for media streams, the location of the shared bottleneck may be identified based on the network routes of the media streams having been identified. The latter may also be identified in various ways. For example, a topology discovery such as a trace-route may be performed between a streaming source and the system, between streaming source(s) and streaming client(s) and/or in-between streaming sources. In a cellular network segment, a network identifier and location may be used to identify the location of a shared bottleneck. Also, the MAC address of a wireless access point may be indicative of shared network access and thus of a shared bottleneck. Also, network elements themselves may signal a problem and thereby identify the location of the problem. For example, a network element may provide information on connected devices, on available bandwidth, on routing information, on available capacity, etc. Another example is that a wireless access point may supply information on connected devices, e.g., indicating that these devices share a wireless link. The streaming may also be monitored at various points in the network. The location of the resource limitation may also be assumed. For example, in case of a live event such as a concert, the streaming sources are likely to be co-located in a small region around the concert, and thus likely use the same ingress network.

Identifying the resource limitation may take place as follows. In case of a network link representing a shared bottleneck, the available bandwidth at the shared bottleneck may be determined. Since the available bandwidth may fluctuate, a (short-term) historical view of the available bandwidth over time may be used to better determine expected available bandwidth in the (near) future. Also, it may be beneficial to identify the capacity so as to directly identify a value of the resource limitation. To determine available bandwidth, any existing method may be used, such as use of network management, e.g., by having network elements, including streaming sources and streaming clients, report on known capacity and known use of bandwidth. Another option is to use active network measurements, e.g., using Variable Packet Size (VPS) or Probe Gap Method (PGM) probing. Such methods allow end-to-end probing and hop-by-hop probing. Another option is to use passive network measurements, e.g., by analysing network traffic to obtain information about the current network situation.

It is noted that, in general, the selection subsystem may be configured for generating the selection data further based on a selection criterion. The selection criterion may be indicative of the substituting of the second media stream by the first media stream in the streaming to the second streaming client being preferred over another substitution in the concurrent streaming of the media streams. Various kinds of selection criteria are conceivable. The selection criterion may be directly evaluated based on the limitation data. Alternatively, the selection subsystem may also use other types of information in evaluating the selection criterion. An example of a selection criterion is a resource criterion giving preference to a substitution which reduces a resource allocation of the resource further than another substitution would. For that purpose, the selection subsystem may access data indicative of the resource allocation caused by the streaming of respective media streams, or may estimate such resource allocation. In a specific example, if the system is acting as a streaming proxy, the selection subsystem may directly estimate the resource allocation of a network link downstream of the streaming proxy by determining the bitrate of a media stream which is to be streamed across the network link. The resource may also report its current resource utilization. Various other options are equally conceivable.

Another example of a selection criterion is a client criterion giving preference to a substitution which affects a selected streaming client or a selected group of streaming clients less than another substitution would. Accordingly, the client criterion may allow differentiating between streaming clients, e.g., by exempting streaming client(s) from substitution, or conversely, targeting other streaming client(s) for substitution. In evaluating the client criterion, the selection subsystem may make use of data describing, flagging or being otherwise indicative of the exempted streaming client(s). Another example of a selection criterion is a source criterion giving preference to a substitution which affects the streaming of a media stream from a streaming source less than another substitution would. Yet another example of a selection criterion is a stream criterion giving preference to a substitution of a media stream being streamed to a smaller number of streaming clients than another media stream. In evaluating the stream criterion, the selection subsystem may make use of data which is indicative of the number of streaming clients accessing a particular media stream. Yet another example of a selection criterion is a similarity criterion giving preference to a substitution of a media stream by another media stream being similar in quality, time alignment, and/or geographical recording location. Here, metadata may be used on the basis of which the similarity of media streams may be evaluated. The metadata may be, but does not need to be, metadata comprised in a respective media stream itself, providing, e.g., a quality indication, a timestamp, a location tag, etc. Additionally or alternatively, the media streams may be analysed by the system to determine the similarity, e.g., in case the system is acting as a streaming proxy. Another type of similarity criterion may give preference to a substitution of a media stream by another media stream that is similar with a larger number of media streams in quality, time alignment, and/or geographical recording location than yet another media stream. Such a media stream may be considered as a representative media stream of the event and may therefore be well suitable for selection as a substitute. It will be appreciated that a number of selection criteria may be combined so as to arrive at the selection for substitution. For example, each selection criteria may individually assign a score to a respective media stream and/or streaming client, and an overall score may then be determined from the individual scores, e.g., as a weighted average.

Figure 6:
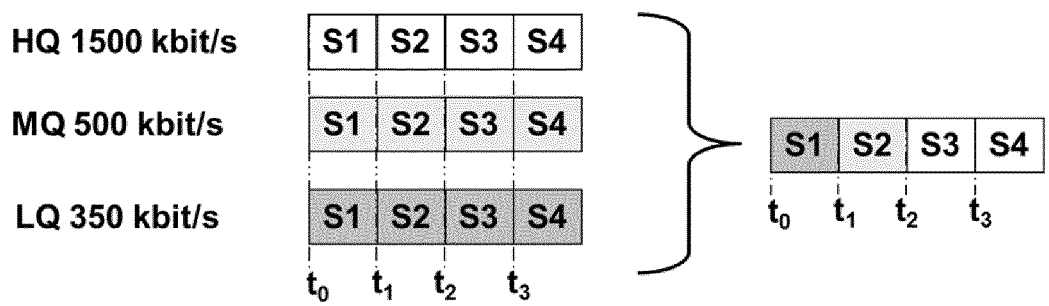
FIG. 6 illustrates segmented media streams obtained by encoding a same recording at different bitrates, thereby enabling adaptive bitrate streaming.
Figure 7:
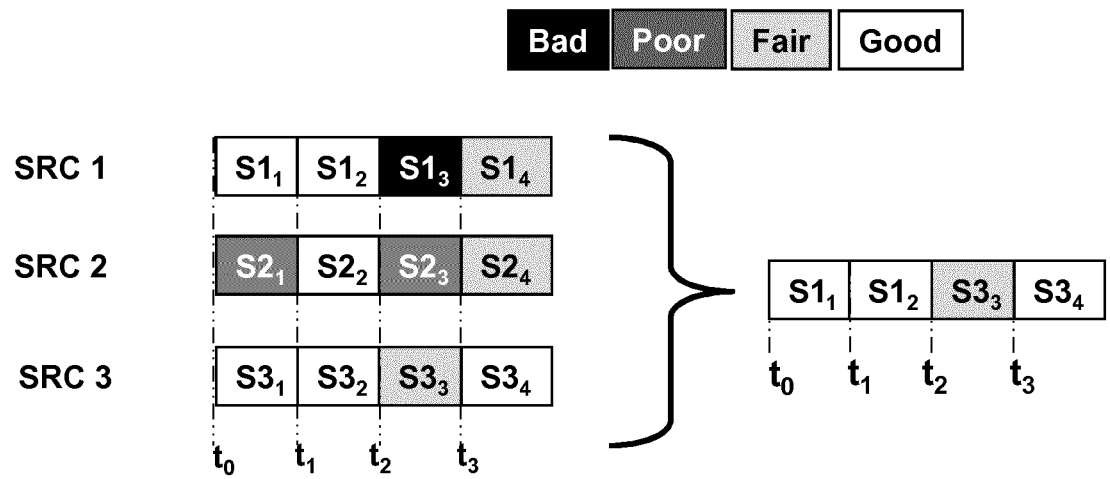
FIG. 7 illustrates an aspect of the invention in that it shows segmented media streams constituting different recordings of a same event, with a quality score having been assigned to each segment of the segmented media streams.

FIGS. 6 and 7 relate to the aforementioned assigning of scores based on one or more selection criteria. Namely, the selection subsystem may be configured for assigning each of the media streams a quality score based on the selection criterion, thereby obtaining a plurality of assigned quality scores, and generating the selection data based on the assigned quality scores to enable the substituting of the second media stream by the first media stream in the streaming to the second streaming client to be selected over another substitution based on a comparison of the plurality of assigned quality scores. As such, the assigned quality scores may implicitly represent a selection of a media stream for being substituted, and/or a selection of a media stream for acting as substitute, in that a comparison of the assigned quality scores may indicate the respective media stream. For example, a media stream having been assigned a low quality score may be selected for being substituted by a media stream having been assigned a high quality score. In this respect, it is noted that the term 'assigning' may refer to each quality score being associated or associate-able with the respective media stream, e.g., by being tagged, stored in relation to an identifier of the media stream, etc. Moreover, the adjective 'quality' may refer to the score representing the outcome of an evaluation, namely the evaluation of one or more selection criteria.

The quality scores may also be assigned to media streams which comprise concurrent portions representing concurrent time periods of the event. For example, the media streams may be segmented media streams constituted by coinciding or at least overlapping segments. Accordingly, the selection subsystem may assign the quality score to each of the media streams on a per-portion or per-segment basis.

FIG. 6 illustrates such segmented media streams as known per se from the field of adaptive bitrate streaming, and in particular the sub-field of HTTP Adaptive Streaming (HAS). With HAS, an audiovisual media stream may be offered in different representations of bitrate and thus quality. For example, a recording may be encoded at 350 kbit/s to provide a Low Quality (LQ) media stream, at 500 kbit/s to provide a Medium Quality (MQ) media stream, and at 1500 kbit/s to provide a High Quality (HQ) media stream. Each media stream may consist of a sequence of consecutive segments S1-S4, which may be independently accessible, transferable and decode-able. Accordingly, segments from the different media streams may be inter- and/or exchanged, thereby enabling a streaming client to switch between the different media stream based on the available bandwidth. This may enable seamless playback, e.g., by preventing or reducing buffering, as a streaming client may temporarily switch to a media stream having a lower quality but requiring a lower transmission bandwidth.

FIG. 7 illustrates segmented media streams constituting different recordings of a same event. The media streams are labelled 'SRC 1', 'SRC 2' and 'SRC 3' denoting that the media streams originate from different streaming sources. It is noted that unlike the media streams of FIG. 6, the media streams of FIG. 7 each represent different content, e.g., different audiovisual recordings. However, the media streams are nevertheless associated by representing different recordings of a same event.

It has been recognized that one or more basic principles employed in HAS can be used in the present context as well, namely to dynamically switch between media streams so as to effect a substitution as determined by the system as claimed. Accordingly, one or more selection criteria may rate each concurrent segment so as to obtain a quality score on a predefined quality scale. It is noted that such a rating may differ on a per-segment basis, e.g., on the basis of each segment causing a different resource utilization. However, this may also be on the basis of the resource limitation differing e.g., in type, value or location. Depending on the type of selection criteria employed, the quality score may also remain substantially constant over a number, or even all, of the segments. In FIG. 7, the concurrent segments are indicated by a same subscript (last) numeral, e.g., $S1_1$, $S2_1$ and $S3_1$. The quality scale in FIG. 7 uses four different quality scores, namely 'Bad', 'Poor', 'Fair' and 'Good'. Here, the quality score 'Bad' may denote that the segment is best to be substituted. For example, in the streaming to a particular streaming client, segment $S1_3$ of media stream 'SRC 1' may be substituted by segment $S3_3$ of media stream 'SRC 3' having a higher quality score 'Fair'. A reason for this may be that media stream 'SRC 1' may represent a higher resource allocation than 'SRC 3', in particular during the streaming of the third segment. Various other kinds of quality scales are equally conceivable. For example, the quality scale may range from 0 to 1, where a 1 indicates a highest possible quality and 0 a lowest possible quality. An alternative may be a Mean Opinion Score (MOS) quality scale ranging from 1, e.g., lowest quality, to 5, e.g., highest quality.

The generating of the selection data, and delivery to a streaming client, make take various forms, and will be further explained with reference to FIGS. 8 and 9.

Figure 8:
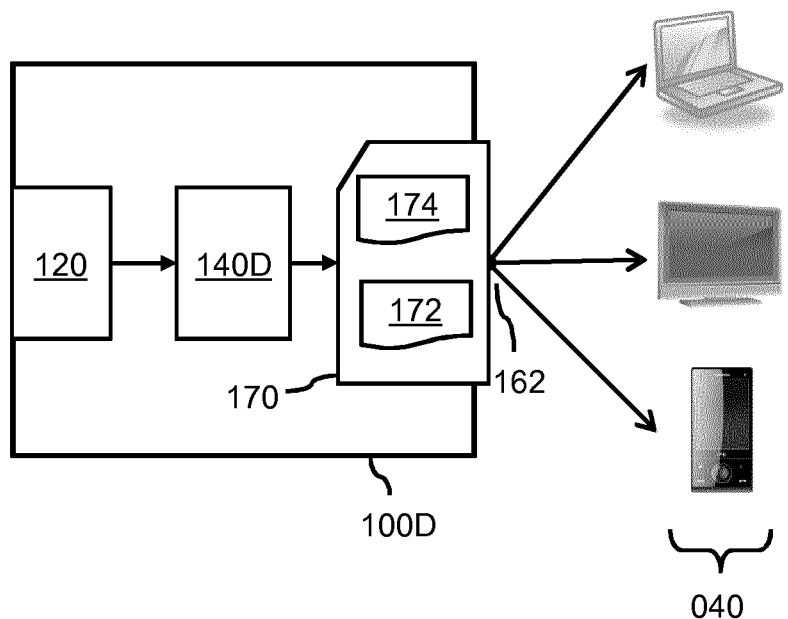
FIG. 8 shows a further embodiment of the system for managing the concurrent streaming of media streams, in which the selection data is formatted as a metadata stream and is made accessible to the streaming clients by including address information to the metadata stream in a manifest for the streaming clients.

FIG. 8 shows an embodiment of a system 100D according to the invention, in which the selection data is formatted as a metadata stream. Here and in the following figures, the output interface is not explicitly shown, instead showing a graphical representation of the data generated by the selection subsystem 140D and made available to the plurality of streaming clients 040 via the output interface.

In the embodiment of FIG. 8, the streaming client(s) 040 may be provided with a manifest 170 which comprises address information 172 for enabling the streaming client(s) to access the plurality of streaming sources 020. Such a manifest 170 may be based on a known type of manifest. For example, within the context of media streaming based on MPEG-DASH, the manifest may be based on a Media Presentation Description (MPD) as defined by MPEG-DASH, which may describe the segments of the available media streams and the addresses of the respective streaming sources 020 from which the segments are accessible. Such addresses may take any suitable form, such as a Uniform Resource Locator (URL) address.

Such a manifest 170 may be provided by the system 100D to the streaming client(s), e.g., via an exchange of messages 162, and may include the aforementioned description 172 of segments of the available media streams. The selection subsystem 140D may use the manifest 170 to make the selection data accessible to the streaming client(s), thereby enabling the streaming client(s) to identify one of the streaming sources from the manifest 170 which is to be accessed so as to effect the substitution. The selection data may take the form of one or more quality scores. The selection subsystem 140D may format the quality scores as a metadata stream, and generate the manifest 170 to include a description 174 of the metadata stream. Such a description 174 may comprise address information, e.g., an URL address, thereby enabling the streaming client to access the metadata stream via the address. As such, the manifest 170 may comprise, in addition to a description 172 of segments of the available media streams also a description 174 of the metadata stream, in which the former may comprise address information for enabling the streaming client(s) to access the plurality of streaming sources 020, and in which the latter may comprise address information for enabling the streaming client(s) to access the metadata stream.

Figure 9:
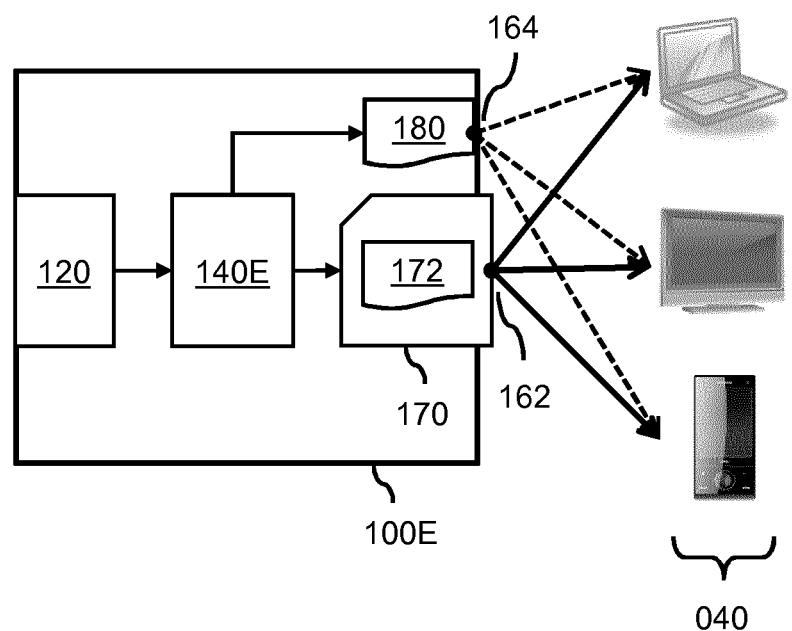
FIG. 9 shows a further embodiment of the system for managing the concurrent streaming of media streams, in which the system provides the selection data to the streaming client via a signalling channel.

FIG. 9 shows a further embodiment of a system 100E according to the invention, in which the selection data is directly provided to the streaming client(s) via a signalling channel. The signalling channel is shown in FIG. 9 implicitly, namely by an additional exchange of messages 164 which is separated from the exchange of messages 162 providing the manifest 170 to the streaming client(s). It is noted that the selection data may be provided asynchronously, e.g., without being explicitly synchronized, with the providing of the manifest 170 to the streaming client(s).

As signalling channel, a so-termed streaming control channel may be used, as described in, e.g., WO 2013/098317 A1. Herein, a method is described for enabling network-initiated control of streaming of segmented content from a delivery node, e.g., a streaming source, to at least one streaming client. The method comprises providing the streaming client with channel set-up information and subsequently establishing at least one streaming control channel between said client and a control channel server function on the basis of said provided channel set-up information. Accordingly, the streaming client may receive at least one manifest file update message via said streaming control channel which may comprise a manifest file or manifest file location information for locating the manifest file. It will be appreciated that the therein described streaming control channel and ways of providing manifest information to a streaming client may be advantageously used in the present context, e.g., to provide such information from the system 100E to the streaming client(s). Accordingly, the system 100E may comprise the control channel server function as described in WO 2013/098317 A1, and the streaming client(s) may communicate with the control channel server function of the system 100E via the streaming control channel.

In general, such a signalling channel may be used to notify the streaming client(s) of availability of a manifest and/or quality scores for streaming. Alternatively or additionally to said notifying, the signalling channel may also be used to send an (updated) manifest, (updated) quality scores and/or control information.

It is noted that in the embodiments shown in FIGS. 8 and 9, the streaming client(s) 040 may be responsible for, based on the selection data, selecting and subsequently retrieving the appropriate media streams from the streaming sources 020. Such selecting and retrieving may be on a per-segment basis. As such, the delivery mechanism for the appropriate segments follows, i.e., may be conceptually analogous to, current HAS approaches, where the streaming client(s) themselves determine which segments to retrieve based on bandwidth information in the MPD.

With further reference to FIGS. 8 and 9, it is noted that the manifest 170 may be a multi-level manifest, e.g., be constituted by a hierarchy of sub-manifests. Accordingly, the description 172 of the segments may be provided in a different sub-manifest than the description 174 of the metadata stream. Such sub-manifests may be transmitted via separate channels. For example, the sub-manifest comprising the description 174 of the metadata stream may be transmitted via a signalling channel.

It is noted that, in general, the selection data may, in addition to one or more quality scores, further comprise association information for enabling the streaming client to associate the quality scores with the plurality of streaming sources. Moreover, the selection subsystem may be configured for, when generating the selection data, maintaining a previous selection of one of the plurality of media streams when a difference in quality score between a concurrent portion of said previous media stream and the selected portion is below a quality threshold. As such, a possible increase in quality score may be determined not to outweigh the disadvantages of switching to a segment from a different media stream. Similarly, the previous selection may be maintained when a length of the concurrent portion is below a length threshold.

It is noted that the media streams involved in the concurrent streaming may be segmented media streams, and that the substitution of one media stream by another media stream may take place on a per-segment basis. However, the substitution as claimed may equally be applied to non-segmented media streams. For example, when acting as a streaming proxy, the system may segment such non-segmented media streams so as to obtain segmented media streams. Alternatively, the switching between media streams may be performed on a different granularity than the aforementioned segment-by-segment basis. For example, dynamic switching may be performed at codec level, e.g., by switching streams at the start of a Group-Of-Pictures (GOP) interval, which start with independently decodable video frames, commonly referred to as I-frames or as IDR frames in H.264/MPEG-4 AVC. It is noted that such switching may be performed even in case the media streams are segmented. Accordingly, the switching may be performed within, e.g., during, concurrent segments.

It is further noted that one or more selection criteria may be evaluated by the streaming sources themselves. Namely, the streaming sources may evaluate a selection criterion, thereby obtaining a quality score, and communicate the quality score to the system, e.g., by adding metadata to the media streams themselves. Accordingly, the evaluation of selection criteria may be at least in part be performed at the streaming source(s) themselves rather than entirely by the system.

In general, the streaming sources may represent sources of live streams, on-demand streams or a combination of both. It is further noted that, in general, the system as claimed may be used to effect multiple substitutions, e.g., in parallel or sequentially, thereby obtaining a concurrent streaming of N media streams based on M media streams being intended for streaming, with N<M. This may further reduce the resource allocation.

It will be appreciated that the system as claimed may be embodied as, or in, a single device or apparatus, such as a server. The device or apparatus may comprise one or more microprocessors which execute appropriate software. The software may have been downloaded and/or stored in a corresponding memory, e.g., a volatile memory such as RAM or a non-volatile memory such as Flash. Alternatively, the functional units of the system may be implemented in the device or apparatus in the form of programmable logic, e.g., as a Field-Programmable Gate Array (FPGA). In general, each functional unit of the system may be implemented in the form of a circuit. It is noted that the system as claimed may also be implemented in a distributed manner, e.g., involving different devices or apparatuses. For example, the system as claimed may be implemented as software running on a plurality of servers.

Figure 10:
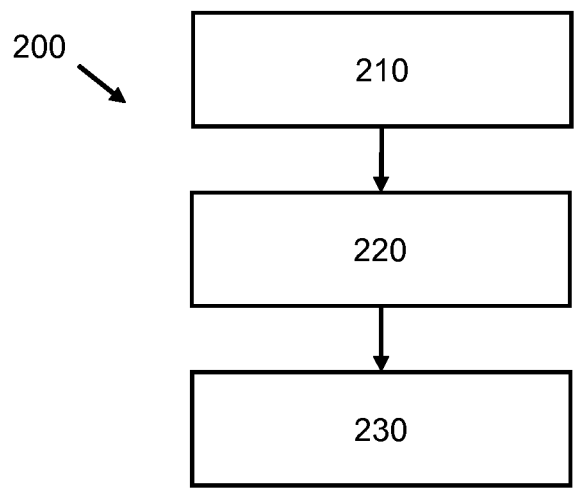
FIG. 10 shows a method for managing the concurrent streaming of at least a first media stream and a second media stream.

FIG. 10 shows a method 200 for managing a concurrent streaming of media streams. The method 200 may correspond to an operation of a system as claimed. However, this is not a limitation in that the method 200 may also be performed separately, e.g., on a different system or device, or in a distributed manner.

The method 200 comprises, in an operation titled "OBTAINING LIMITATION DATA", obtaining 210 limitation data indicative of the resource limitation being exceeded by the concurrent streaming of, at least i) the first media stream streaming to a first streaming client, and ii) the second media stream streaming to a second streaming client.

The method 200 further comprises, in an operation titled "GENERATING SELECTION DATA REPRESENTING SELECTION OF MEDIA STREAM", based on the limitation data, generating 220 selection data representing a selection of the first media stream for substituting the second media stream in the streaming to the second streaming client. The method 200 further comprises, in an operation titled "OUTPUTTING SELECTION DATA", outputting 230 the selection data for effecting the substituting of the second media stream by the first media stream in the streaming to the second streaming client.

It will be appreciated that a method according to the invention may be implemented in the form of a computer program which comprises instructions for causing a processor system to perform the method. The method may also be implemented in dedicated hardware, or as a combination of the above.

Figure 11:
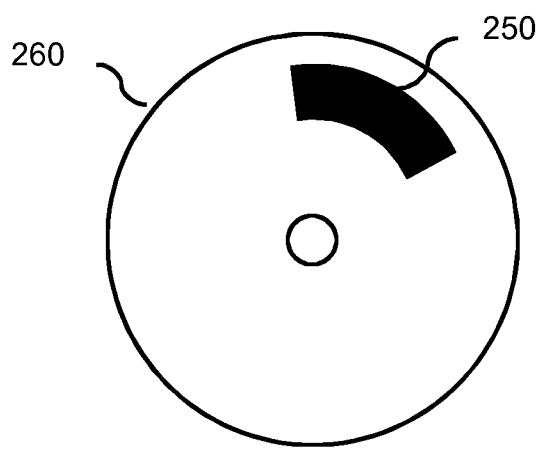
FIG. 11 shows a computer program product comprising instructions for causing a processing system to perform the method.

The computer program may be stored in a non-transitory manner on a computer readable medium. Said non-transitory storing may comprise providing a series of machine readable physical marks and/or a series of elements having different electrical, e.g., magnetic, or optical properties or values. FIG. 11 shows a computer program product comprising the computer readable medium 260 and the computer program 250 stored thereon. Examples of computer program products include memory devices, optical storage devices, integrated circuits, servers, online software, etc.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A system for managing a concurrent streaming of media streams, the media streams comprising at least a first media stream and a second media stream, the first media stream and the second media stream representing different recordings recorded by different recording devices of an event, the concurrent streaming of the media streams being enabled by a resource having a resource limitation, the system comprising:
   an input interface module, when operable within a computing device, causes the computing device to obtain limitation data indicative of the resource limitation being exceeded by the concurrent streaming of, at least:
      i) the first media stream streaming to a first streaming client, and
      ii) the second media stream streaming to a second streaming client;
   a selection subsystem module having a processor configured to, based on the limitation data, generate selection data representing a selection of the first media stream for substituting the second media stream in the streaming to the second streaming client by the first media stream, wherein as a result of the substitution, the second streaming client streams the same media stream as the first media client instead of the second media stream;
   wherein the selection subsystem module is configured for generating the selection data further based on a selection criterion, the selection criterion being indicative of the substituting of the second media stream by the first media stream in the streaming to the second streaming client being preferred over another substitution in the concurrent streaming of the media streams, wherein the selection criterion is at least one of:
      a stream criterion giving preference to a substitution of a media stream being streamed to a smaller number of streaming clients than another media stream, and
      a similarity criterion giving preference to a substitution of a media stream by another media stream being similar in quality, time alignment, and/or geographical recording location; and
   an output interface module, when operable within the computing device, causes the computing device to output the selection data for effecting the substituting of the second media stream by the first media stream in the streaming to the second streaming client.

2. The system according to claim 1, wherein the selection subsystem module is further configured for:
   assigning each of the media streams a quality score based on the selection criterion, thereby obtaining a plurality of assigned quality scores, and
   generating the selection data based on the assigned quality scores to enable the substituting of the second media stream by the first media stream in the streaming to the second streaming client to be selected over another substitution based on a comparison of the plurality of assigned quality scores.

3. The system according to claim 2, wherein the media streams comprise concurrent portions representing concurrent time periods of the event, and wherein the selection subsystem module is further configured for assigning the quality score to each of the media streams on a per-portion-basis.

4. The system according to claim 1, wherein the quality score is assigned based on a number of selection criteria.

5. The system according to claim 1, wherein the selection criterion further comprises at least one of:
   a client criterion giving preference to a substitution which affects a selected streaming client or a selected group of streaming clients less than another substitution, and
   a source criterion giving preference to a substitution which affects the streaming of a media stream from a streaming source less than another substitution.

6. The system according to claim 1, wherein the resource limitation is at least one of:
   a bandwidth limitation in the concurrent streaming of the media streams across a network segment,
   a readout limitation in the readout of the media streams from a computer readable medium, and
   a processing limitation in the processing of the media streams.

7. The system according to claim 1, wherein the second streaming client is provided with a manifest, the manifest comprising address information for enabling the second streaming client to access the media streams, and wherein:
   the selection data is generated to enable the second streaming client to select the first media stream from the manifest;

the output interface module is configured for providing the selection data to the second streaming client.

8. The system according to claim 1, wherein the output interface module is configured for formatting the selection data as a metadata stream.

9. The system according to claim 1, wherein the media streams comprise concurrent portions representing concurrent time periods of the event, wherein the selection subsystem module is configured for generating a manifest for the second streaming client, the manifest comprising a playlist identifying different portions of the media streams for being consecutively accessed, at least one of the different portions having been selected based on the selection data.

10. The system according to claim 1, configured as a streaming proxy between at least the second streaming client and at least a streaming source providing the first media stream, the system being configured for streaming the first media stream to the second streaming client in accordance with the selection data.

11. A method for managing a concurrent streaming of media streams, the media streams comprising at least a first media stream and a second media stream, the first media stream and the second media stream representing different recordings recorded by different recording devices of an event, the concurrent streaming of the media streams being enabled by a resource having a resource limitation, the method comprising:
obtaining limitation data indicative of the resource limitation being exceeded by the concurrent streaming of, at least:
i) the first media stream streaming to a first streaming client, and
ii) the second media stream streaming to a second streaming client;
based on the limitation data, generating selection data representing a selection of the first media stream for substituting the second media stream in the streaming to the second streaming client by the first media stream, wherein as a result of the substitution, the second streaming client streams the same media stream as the first media client instead of the second media stream;
wherein generating the selection data is further based on a selection criterion, the selection criterion being indicative of the substituting of the second media stream by the first media stream in the streaming to the second streaming client being preferred over another substitution in the concurrent streaming of the media streams, wherein the selection criterion is at least one of:
a stream criterion giving preference to a substitution of a media stream being streamed to a smaller number of streaming clients than another media stream, and
a similarity criterion giving preference to a substitution of a media stream by another media stream being similar in quality, time alignment, and/or geographical recording location; and
outputting the selection data for effecting the substituting of the second media stream by the first media stream in the streaming to the second streaming client.

12. A computer program product comprising instructions for causing a processing system to perform the method according to claim 11.

* * * * *